United States Patent
Feldman

(10) Patent No.: US 9,533,616 B2
(45) Date of Patent: Jan. 3, 2017

(54) SYSTEM AND METHOD FOR USER SELECTABLE AUDIBLE EVENT INDICATION FOR A VEHICLE

(71) Applicant: Shahar Feldman, Tel Aviv (IL)

(72) Inventor: Shahar Feldman, Tel Aviv (IL)

( * ) Notice: Subject to any disclaimer, the term of this patent is extended or adjusted under 35 U.S.C. 154(b) by 222 days.

(21) Appl. No.: 14/205,580

(22) Filed: Mar. 12, 2014

(65) Prior Publication Data

US 2014/0266658 A1   Sep. 18, 2014

Related U.S. Application Data

(60) Provisional application No. 61/777,743, filed on Mar. 12, 2013.

(51) Int. Cl.

| | | |
|---|---|---|
| *B60Q 1/00* | (2006.01) | |
| *B60Q 5/00* | (2006.01) | |
| *B60Q 1/26* | (2006.01) | |
| *B60Q 1/50* | (2006.01) | |

(52) U.S. Cl.
CPC ............... *B60Q 5/008* (2013.01); *B60Q 1/268* (2013.01); *B60Q 1/50* (2013.01); *B60Q 5/005* (2013.01); *B60Q 2900/30* (2013.01)

(58) Field of Classification Search
CPC ....................................................... B60Q 5/00
USPC .... 340/425.5, 426.1, 438; 704/200, E19.008
See application file for complete search history.

(56) References Cited

U.S. PATENT DOCUMENTS

| | | | |
|---|---|---|---|
| 5,245,694 A | * | 9/1993 | Zwern ................ B60R 16/0373 704/200 |
| 5,635,903 A | | 6/1997 | Koike et al. |
| 6,348,859 B1 | | 2/2002 | Baker |
| 8,179,234 B1 | | 5/2012 | Atwood |
| 2003/0141967 A1 | * | 7/2003 | Aichi .................. B60N 2/4876 340/435 |

FOREIGN PATENT DOCUMENTS

WO    WO-96/36949    11/1996

OTHER PUBLICATIONS

Sharath, PK; "Design and Development of Embedded System for Monitoring Driver Behavior using Lane Sensors" SasTech, Sep. 2009, Vo. 8, No. 2, p. 89.
International Search Report for International Application No. PCT/IL14/50256 dated Jul. 9, 2014.

* cited by examiner

*Primary Examiner* — Daryl Pope
(74) *Attorney, Agent, or Firm* — Pearl Cohen Zedek Latzer Baratz LLP

(57) ABSTRACT

A sound generation system for a vehicle includes a sound generator for operating a speaker of the vehicle to produce an audible sound. A controller detects a vehicle operation event and controls the sound generator to generate an audible indication of the event, an association of the audible indication with the event being programmable by a user.

17 Claims, 2 Drawing Sheets

SYSTEM AND METHOD FOR USER SELECTABLE AUDIBLE EVENT INDICATION FOR A VEHICLE

CROSS REFERENCE TO RELATED APPLICATIONS

The present invention claims the priority benefit of U.S. provisional patent application No. 61/777,743 filed on Mar. 12, 2013, which is incorporated in its entirety herein by reference.

FIELD OF THE INVENTION

The present invention relates to generation of a user-selectable audible indication of an event related to operation of a vehicle.

BACKGROUND

Electric and hybrid vehicles that are powered either fully or in part by electricity and are becoming increasingly popular. The increased popularity is due in part to rising prices of fossil fuels, as well as to the environmental concerns of fossil fuel emissions and their contribution to air pollution and to the greenhouse effect. In parallel, manufacturers of such electric and hybrid vehicles continue to improve the vehicles' performance and reliability.

The growing number of electric vehicles in traffic creates new and potential risks to the safety of pedestrians, bicyclists, runners, children, pets, wildlife, and other vehicle operators. Such pedestrians and others are often used to hearing the presence or approach of a vehicle, and will often expect such audible cues when approaching a road or driveway. As the sound generated by engines of electric vehicles generate is almost inaudible, pedestrians and other users of the road cannot audibly detect the approach or presence of an electric vehicle.

When the pedestrian is blind or vision impaired, the dependence of audible clues to the presence of a vehicle is increased. The lack of audibility of an approaching electric vehicle could prove disastrous.

The Pedestrian Safety Enhancement Act of 2010 mandates the Secretary of Transportation to promulgate a motor vehicle safety standard "establishing performance requirements for an alert sound that allows blind and other pedestrians to reasonably detect a nearby electric or hybrid vehicle . . . and . . . requiring new electric or hybrid vehicles to provide an alert sound conforming to the requirements of the motor vehicle safety standard established." In order to determine the standard, the Secretary is instructed to "determine the minimum level of sound emitted from a motor vehicle that is necessary to provide blind and other pedestrians with the information needed to reasonably detect a nearby electric or hybrid vehicle" and to "determine the performance requirements for an alert sound that is recognizable to a pedestrian as a motor vehicle in operation."

SUMMARY

There is thus provided, in accordance with some embodiments of the present invention, a sound generation system for a vehicle, the system including: a sound generator for operating a speaker of the vehicle to produce an audible sound; and a controller to detect a vehicle operation event and to control the sound generator to generate an audible indication of the event, an association of the audible indication with the event being programmable by a user.

Furthermore, in accordance with some embodiments of the present invention, the controller is configured to control production of a visible indication of the event, an association of the visible indication with the event being programmable by a user.

Furthermore, in accordance with some embodiments of the present invention, the visible indication includes operation of a light of the vehicle.

Furthermore, in accordance with some embodiments of the present invention, the operation of the light includes flashing or blinking the light.

Furthermore, in accordance with some embodiments of the present invention, the visible indication includes display of an image on a display of the vehicle.

Furthermore, in accordance with some embodiments of the present invention, the image includes an image sequence, a video clip or a video loop.

Furthermore, in accordance with some embodiments of the present invention, the visible indication is visible from inside or from outside of the vehicle.

Furthermore, in accordance with some embodiments of the present invention, the vehicle is an electric or hybrid vehicle.

Furthermore, in accordance with some embodiments of the present invention, the audible indication is imitative of a sound of an internal combustion engine.

Furthermore, in accordance with some embodiments of the present invention, the vehicle operation event includes a manner of driving of the vehicle.

Furthermore, in accordance with some embodiments of the present invention, the manner of driving is selected from a group consisting of a vehicle speed, acceleration, deceleration, braking, or turning.

Furthermore, in accordance with some embodiments of the present invention, the vehicle operation event includes access to an interior of the vehicle.

Furthermore, in accordance with some embodiments of the present invention, the access includes opening a door of the vehicle.

Furthermore, in accordance with some embodiments of the present invention, the system further includes a sensor, wherein the controller is configured to detect the vehicle operation event by receiving data from the sensor.

Furthermore, in accordance with some embodiments of the present invention, the controller is configured to communicate with an interface device, the interface device being operable by the user to program the association of the audible indication with the event.

Furthermore, in accordance with some embodiments of the present invention, the audible indication is audible from the exterior or the interior of the vehicle.

There is further provided, in accordance with some embodiments of the present invention, a method for sound generation in a vehicle, the method including: detecting a vehicle operation event; and controlling a sound generator, the sound generator to operate a speaker to generate an audible indication of the event, an association of the audible indication with the event being programmable by a user.

Furthermore, in accordance with some embodiments of the present invention, the method further includes generating a visible indication, an association of the visible indication with the event being programmable by a user.

Furthermore, in accordance with some embodiments of the present invention, the vehicle operation event includes a manner of driving of the vehicle. or access to an interior of the vehicle.

Furthermore, in accordance with some embodiments of the present invention, the vehicle operation event includes access to an interior of the vehicle.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION

Figure 1:
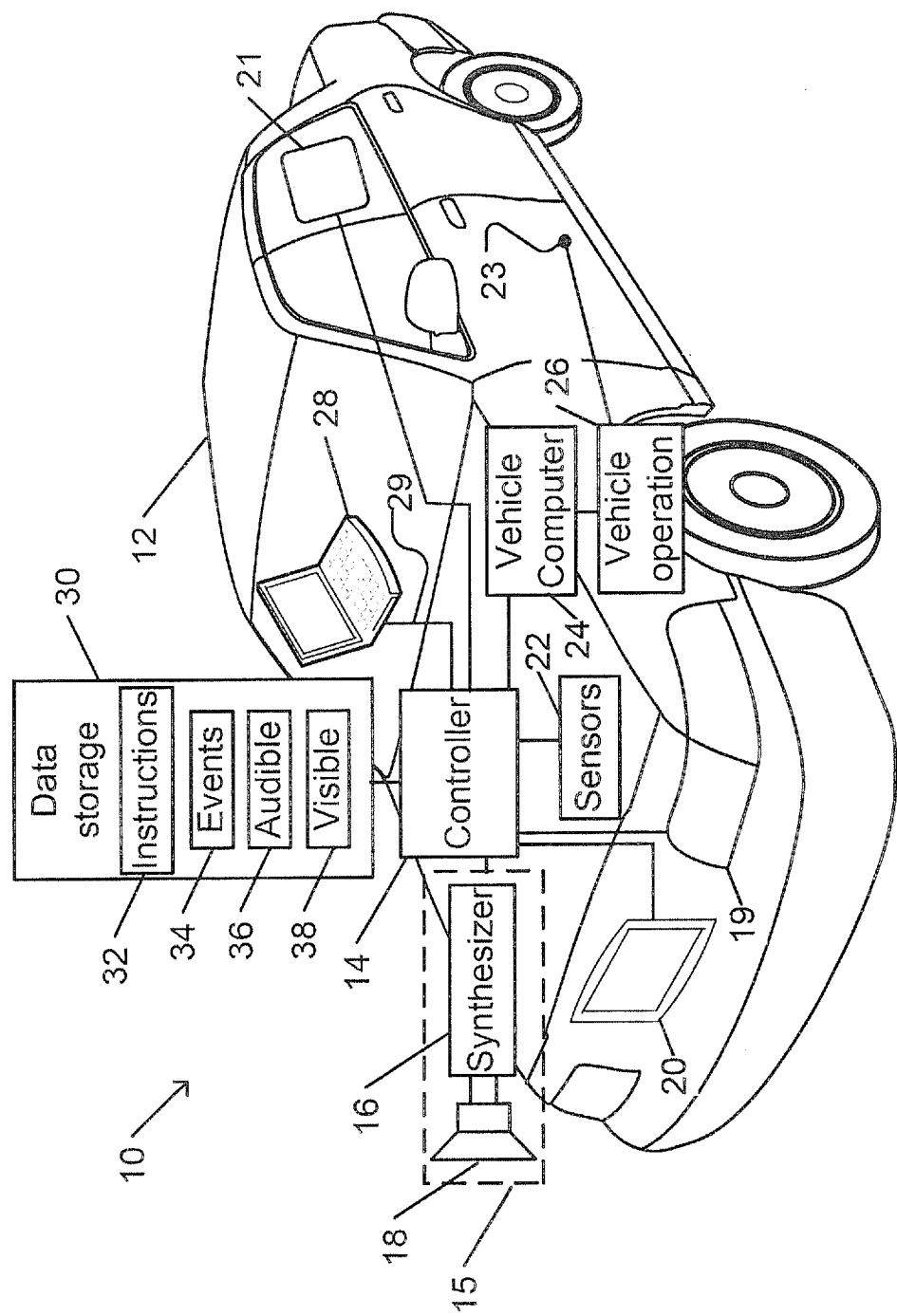
FIG. 1 is a schematic drawing of a vehicle with a system for user selectable audible event indication, in accordance with an embodiment of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Embodiments of the invention may include an article such as a computer or processor readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein.

In accordance with an embodiment of the present invention, a vehicle is provided with an sound generation system with a speaker. The speaker may be an interior speaker or an exterior speaker. An exterior speaker refers herein to a speaker or other sound transducer with a sound producing component, such as a diaphragm, that is located on an outward facing side of a wall, roof, window, door, or other enclosure of the vehicle, and that is configured to produce a sound in the environment surrounding the vehicle. An interior speaker refers herein to sound producing component that produces a sound that is audible to a driver, operator or passenger in the interior of the vehicle. A controller is configured to control operation of the sound generation system.

The controller is configured to detect vehicle operation events. As used herein, a vehicle operation event is refers to an event resulting from or affecting operation of the vehicle itself, and not of a sound generating system of the vehicle. For example, a vehicle operation event may include an event related to propulsion or manner of driving of the vehicle (e.g., motor operation, motion within a speed range, acceleration, deceleration or braking, turning or steering, gear operation, spring operation, or other motion- or propulsion-related events), exterior lights (e.g., operation of a headlight, fog light, turn signal, brake light, backup light, or other exterior light), access to the vehicle (e.g., locking, unlocking, opening, or closing of an exterior door, window, trunk, tailgate, hatch, or other opening to the vehicle). A nature of a vehicle operation event may be affected by external conditions that relate to or affect operation of the vehicle (e.g., meteorological conditions, traffic conditions, or road conditions). Specifically excluded from vehicle operation events are events resulting solely from operation of any system or component of the vehicle whose primary purpose is to produce a sound. Thus, a vehicle operation event does not include operation of (e.g., operating a control of) a radio, sound system, or audio-video system; a horn, siren, bell, or other interior or exterior audible warning system or device; an interior or exterior speaker system; a navigation system; or a telephone, radio, or other communication system.

The controller is configurable to operate the sound generator to produce a particular sound or audible indication in response to a particular detected vehicle operation event. For example, a user may access a user interface of the controller. The user interface may enable the user to select a vehicle operation event from a database of such events, or to define a vehicle operation event. The user interface may further enable the user to select an audible indication from a database of audible indications, or to define an audible indication. The user interface may further enable the user to program an association of a particular audible indication with a particular vehicle operation event. In some cases, the user interface may further enable the user to select or define a visible indication, and to associate a particular visible indication with a particular vehicle operation event.

For example, the vehicle may be an electric or hybrid vehicle with an electrical or hybrid engine that operates without producing a sound that is clearly audible outside of the vehicle. The vehicle may have an internal combustion engine, or another type of propulsion system. The generated sound may be designed to inform the surroundings of the vehicle of an event related to operation of the vehicle. The generated sound may be designed to inform the people within the vehicle of an event related to operation of the vehicle.

The sound generation system includes a sound synthesizer or generator that is controllable to produce a sound. A speaker or other sound transducer may amplify or broadcast the generated sound to the exterior or interior of the vehicle.

A controller transmits one or more electronic signals to the sound generator to cause the sound generator to generate the sound. For example, the electronic signal may include an analog or digital waveform that is modulated in a manner that represents the sound to be generated. As another example, the electronic signal may include encoded information (e.g., defining components of a series representation of the sound that is to be generated) that is interpretable by the sound generator to synthesize the sound.

The controller may communicate with one or more sensors that sense a vehicle operation event or condition. Typically, the vehicle operation event or condition is associated with operation of one or more systems or components of the vehicle. As used herein, either an event (e.g., a change in status) or a condition (e.g. a continuing state of the vehicle) is herein referred to as an event. For example, a vehicle operation event may include operation of the motor of the vehicle, motion of the vehicle, turning of the vehicle, a speed of the vehicle, turning of the vehicle, signaling a turn of the vehicle, braking of the vehicle, detection of predetermined traffic conditions (e.g., residential street, highway, shopping center or commercial district, heavy or light traffic, crosswalk, bicycle lane, or direction of motion of the vehicle), meteorological or environmental conditions (e.g., fog or mist, precipitation, exceptionally noisy or quiet environment, day or night), opening a door or window, loading or unloading (e.g., of a truck), on or off duty (e.g., for a bus or taxi), operation of exterior lights, automatic or manual control of the vehicle, heavy load, or other conditions related to operation of the vehicle. In particular, a vehicle operation event may include a condition or operation that may be of significance to others (e.g., pedestrians or other vehicle operators) in the vicinity of the vehicle.

The generated audible indication or sound may be such as to indicate the type of vehicle operation event in a manner that is audible in the surroundings of the vehicle. For example, the generated sound may mimic or be imitative of a sound of another vehicle (e.g., engine sounds of an internal combustion vehicle) under similar circumstances (e.g., ignition, driving, turning, accelerating, or other vehicle operation event).

Sensor may include standard vehicle sensors or monitoring systems, or additional sensors. For example, sensors may include a vehicle speedometer, tachometer, clock, steering sensor, electrical system sensors or circuits (e.g., indicating operation status of lights, door open or closed, application of brakes or turn signals, operation of wipers, or other electrical system sensors), navigation system (e.g., Geographic Positioning System (GPS) data, gyroscope or compass, accelerometer, or other navigation system), meteorological or environmental sensors (e.g., temperature, humidity gauge, precipitation sensor, external illumination sensor, or other meteorological or environmental sensor), or transmitted data from an external service (e.g., traffic monitoring service, meteorological service, road conditions monitoring service, or other service), or other sensor.

The controller may be configured to analyze sensor data to detect a vehicle operation event. For example, a vehicle operation event may include operation of the motor, driving in a predetermined mariner (e.g., speed or speed range; acceleration, deceleration, or braking; turning); gear operation, exterior light operation (turning on or off of headlights, fog lights, turn signals, backup lights, or other exterior lights), driving on a particular type or road or under particular traffic conditions (e.g., from proximity sensor, UPS data, or from a traffic monitoring service), exterior illumination (e.g., determined from an illumination sensor, from a meteorological service, or deduced from a clock reading), visibility conditions (e.g., related to meteorological conditions or road topography), an open or closed door, trunk, or tailgate, or another vehicle operation event.

The controller is programmable by a user to cause a particular sound to be generated in response to a particular detected vehicle operation event. A user interface may be provided to enable the user (e.g., a driver, owner, or passenger of the vehicle) to program or control operation of the controller to associate the sound with the vehicle operation event. For example, the user interface may present the user with a list of detectable vehicle operation events, and with a second list of sounds that may be generated. The user may then assign a selected sound to a particular vehicle operation event or group of vehicle operation events. The user interface may, in some cases, enable customization a definition of a vehicle operation event or a generated sound. For example, the user may select a speed range or otherwise define a vehicle operation event. The user may adjust a volume or pitch of a generated sound, or a duration or other property of the sound.

The controller may then control the sound generator to produce the selected sound when the particular vehicle operation event occurs or is detected.

In accordance with some embodiments of the present invention, the vehicle may be configured to produce a display that is visible from outside or inside the vehicle. The display may include operation of exterior or interior lights, or a display screen or display capability that is incorporated into or mounted on an exterior or interior surface of the vehicle. Exterior lights may include standard exterior lights (e.g., headlamps, fog lights, turn or brake signals, backup light, or other externally visible lights), or lights that are dedicated to operation by the controller in response to a vehicle operation event. Interior lights may include standard interior lights (e.g., illumination lights, or lights on a control panel or dashboard), or lights that are dedicated to operation by the controller in response to a vehicle operation event. A display for displaying an image may include a light emitting diode (LED) display that is mounted or incorporated into a flat or curved exterior or interior wall of the vehicle. A display may include a liquid crystal display (LCD) screen that is mounted on an exterior or interior wall of the vehicle, or an LCD capability that is incorporated into a window of the vehicle.

The controller may be programmable by a user to generate or produce a particular display in response to a particular detected vehicle operation event, or in coordination with a generated sound. For example, exterior or interior lights may be turned on or off, may flash or blink or a displayed image may include a single still image, may include a sequence of still images (e.g., similar to a slide show), may include continuously displayed video loop, or may include a video clip (e.g., being displayed once). Content of the displayed image may be related to a generated sound (e.g., a visible warning in addition to an audible warning, or visible content that relates to the audible sound in another manner), or may be independent of any generated sound.

A user interface may the user to program or control operation of the controller to associate a displayed image with a vehicle operation event. For example, the user interface may present the user with a list of detectable vehicle operation events, and with a second list of images that may be displayed. The user may then assign a selected image (e.g., still image, video clip, or group of images or video clips) to a particular vehicle operation event or group of vehicle operation events. The user interface may, in some cases, enable customization a definition of a vehicle operation event or a displayed image. For example, the user may adjust a brightness or hue of an image (e.g., to render the image visible under particular lighting conditions), speed of a video clip or loop, a duration for which an image is displayed, transition effect (e.g., for a sequence of images), or other property of the display.

Providing a vehicle with a capability for user selectable sound generation, in accordance with an embodiment of the present invention, may be advantageous over conventional sound generating systems.

For example, a conventional synthetic sound generation system for an electric or hybrid vehicle would typically produce a single type of sound (typically an engine sound) that cannot be selected or modified for a particular situation or in accordance with a user preference. A conventional system would not address other situations, such as an open door, that could likewise present an obstacle for visually impaired pedestrians. A conventional system would not be configured to produce a visible indication of a vehicle operation event to accompany an audible indication.

On the other hand, user selectable sound generation, in accordance with an embodiment of the present invention, may enable generation of audible indications of a variety of vehicle operation events. For example, an audible indication may be generated to indicate an open door (which may pose an obstacle to a vision-impaired pedestrian). Production of a visible display, in accordance with some embodiments of the present invention, may further warn people in the surroundings (e.g., a cyclist who may be more attuned to a visible indication than to an audible indication) of a potential hazard. In addition, since a vehicle owner or user is sometimes provided with the opportunity to personalize or customize a purchased vehicle, the purchaser may also wish to customize exterior or interior sounds that are produced by the vehicle.

In accordance with an embodiment of the present invention, a vehicle may be provided or equipped with a system for user selectable sound generation. For example, the vehicle may be manufactured with a system for user selectable exterior or interior sound generation. Alternatively or in addition, all or part of a system for user selectable exterior or interior sound generation may be installed in a vehicle after the vehicle is manufactured or purchased.

FIG. 1 is a schematic drawing of a vehicle with a system for user selectable audible event indication, in accordance with an embodiment of the present invention.

Audible event indication system 10 is installed in a vehicle 12. A vehicle 12 may include any type of self-powered vehicle. Typically, vehicle 12 is a self-propelled vehicle designed for travel on land (e.g., automobile, truck, bus, recreational vehicle, transport, motorcycle, motorized cart, or other motorized land vehicle). However, audible event indication system 10 may be adapted to be installed on another type of vehicle (e.g., train, boat, airplane, helicopter, or other type of vehicle).

Audible event indication system 10 includes controller 14. For example, controller 14 may include one or more intercommunicating processing units, e.g. of one or more computers. Controller 14 may include, may be included with, may share one or more components with, or may communicate with, vehicle computer 24. Vehicle computer 24 represents an onboard computer or computer system that may be operated to control or monitor one or more systems or components of vehicle 12. Vehicle computer 24 may be configured to control, monitor, or both, vehicle operation 26. For example, vehicle operation 26 may include one or more built-in sensors that sense a status of one or more systems of vehicle 12. Sensors associated with vehicle operation 26 may include one or more of a speedometer, tachometer, odometer, fuel gauge, engine or exterior temperature, fluid levels or pressure, operation of vehicle lights 19, open/closed status of doors or windows (e.g., from door/window sensors 23), electrical power consumption, fuel consumption, gear status, navigation sensors (e.g., GPS, accelerometer, compass or gyroscope), seat occupation, seat belt and air bag use, vehicle proximity sensors (e.g., onboard radar, or optical or ultrasonic rangefinder), or other sensors. Vehicle operation 26 may include control or operation of one or more systems or components of vehicle 12. For example, vehicle operation 26 may include control of one or more of engine operation, of vehicle lights 19, operation of windows or doors, operation of indoor temperature control systems, cruise control or automatic vehicle control systems, window operation, interior warnings and alerts, or another vehicle system.

Controller 14 may communicate with data storage device 30. Data storage device 30 may include one or more fixed or removable nonvolatile data storage devices. For example, data storage device 30 may include a computer readable medium for storing programmed instructions 32 for operation of controller 14. It is noted that a component of storage device 30 may be remote from controller 14. Such a component of data storage device 30 may include a storage device of a remote server storing some or all of programmed instructions 32 in the form of an installation package or packages that can be downloaded and installed for execution by controller 14. Data storage device 30 may be utilized to store data or parameters for use by controller 14 during operation, or results of operation of controller 14. Data storage device 30 may include a volatile or non-volatile memory device.

Data storage device 30 may be used to store vehicle operation event database 34. Vehicle operation event database 34 may include parameters for defining one or a plurality of vehicle operation events. For example, a definition of a vehicle operation event may define a sensor and a sensor result that is indicative of the vehicle operation event. For example, definition of a vehicle operation event related to motion of vehicle 12 may include a range of speedometer, accelerometer, or similar sensor readings. Parameters that are specific to a particular type of vehicle operation event may be described. Vehicle operation events in vehicle operation event database 34 may be organized in groups of related vehicle operation events (e.g., open door, open door on right/left, specific door open; motion, fast/slow motion).

Data storage device 30 may be used to store audible indication database 36. Audible indication database 36 may include parameters for defining one or a plurality of sounds. For example, a definition of a sound may include a plain-language description of the sound (e.g., engine sound, beeping, buzzing, music) and parameters that specify properties of the sound in a manner understandable to a non-specialist (e.g., racing/idling engine sound; frequency and duration of beeps; pitch, loudness, duration, or other properties of a sound). A definition of a sound may include instructions that enable sound generator 15 to generate a sound selected from audible indication database 36. For example, audible indication database 36 may include an appropriate wave series (e.g., Fourier series) representation of the sound to be generated (e.g., series of frequencies, phases, and amplitudes), a digitized rendering of the sound to be generated, or other instructions.

Data storage device 30 may be used to store visible indication database 38. Visible indication database 38 may include parameters for defining one or a plurality of visible indications. For example, a definition of a visible indication may include a plain language description of a visible indication (e.g., flashing of a vehicle light 19, content of image or video clip). Parameters may specify a property of a visible indication (e.g., brightness, frequency of flashing, duration, rate of change of images, speed of video, or other parameterized property).

One or more of vehicle operation event database 34, audible indication database 36, or visible indication database 38 may include a linkage of a vehicle operation event to an audible indication, a visible indication, or both. An audible indication may include two or more sounds (e.g., generated by different sound generators 15 at different positions on vehicle 12). A linkage may be of a vehicle operation event to two or more visible indications (e.g., flashing vehicle lights 19 and and displayed on vehicle display 20 or on window display image, flashing of two or more different sets of vehicle lights 19, different images displayed on different displays such as vehicle display 20 and window display 21, or another combination of two visible indications).

A linkage of a vehicle operation event to an audible indication or visible indication may be made by a user operating user interface device 28. For example, user interface device 28 may communicate with controller 14 via interface connection 29. Interface connection 29 may be wired or wireless.

Interface device 28 may be incorporated into vehicle 12 (e.g., an input/output device for operation of controller 14 or of vehicle computer 24), may be associated with a user (e.g., a portable computer, a mobile communication device such as a smartphone, or a remote stationary computer). Interface device 28 may be located remotely from vehicle 12. Interface device 28 may access a user interface of controller 14 to select a sound from audible indication database 36, a visible indication from visible indication database 38, or both, to be associated with a vehicle operation event selected from vehicle operation event database 34.

Interface device 28 may be operated to add an audible indication to audible indication database 36. For example, interface device 28 may be operated to upload an audio or sound file to controller 14 and to data storage device 30. Similarly, interface device 28 may be operated to add a visible indication to visible indication database 38. For example, interface device 28 may be operated to upload an image or video file to controller 14 and to data storage device 30.

Programmed instructions 32 may include instructions to detect a vehicle operation event of vehicle operation event database 34. For example, controller 14 may be configured to receive data from vehicle computer 24 regarding sensor readings from vehicle operation 26. Controller 14 may be configured to receive sensed data from one or more sensors 22. For example, sensors 22 may include readings from one or more sensors that are not received via vehicle computer 24. For example, sensors 22 may include a sensor that was installed on vehicle 12 as part of installation of audible event indication system 10. Sensors 22 may include, for example, any of the types of sensors listed above in connection with vehicle operation 26. Sensor 22 may include one or more meteorological sensors. Sensors 22 may include data or information received from a remote service. For example, sensors 22 may include information from a traffic monitoring service, a road conditions monitoring service, a meteorological service, or another remote service.

Sensors 22 may include, for example, any of the types of sensors listed above in connection with vehicle operation 26. Conversely, types of sensors listed above in connection with sensors 22 may be included among the sensors listed above in connection with vehicle operation 26.

Controller 14, operating in accordance with programmed instructions 32 and vehicle operation event database 34 may determine that one or more sensed conditions correspond to a vehicle operation event. In this manner, controller 14 may detect a vehicle operation event from vehicle operation event database 34.

Controller 14 may determine that a detected vehicle operation event is associated with a sound from audible indication database 36. Controller 14 may then operate in accordance with programmed instructions 32 and audible indication database 36 to cause sound generator 15 to generate the sound. For example, programmed instructions 32 may include an appropriate driver to enable controller 14 to control operation of sound generator 15.

Sound generator 15 may include a sound synthesizer 16. For example, sound synthesizer 16 may be configured to synthesize a sound based on parameters in audible indication database 36. Sound synthesizer 16 appropriate circuitry or processing capability to convert a digital representation of a sound into a corresponding analog signal for operation of speaker 18 of sound generator 15. Sound synthesizer 16 may include appropriate circuitry for extracting an analog sound signal from a modulated analog signal. Sound synthesizer 16 may include an appropriate amplifier for adjusting the amplitude of an analog signal to an appropriate level.

Sound synthesizer 16 may operate speaker 18 to generate a selected sound outside of vehicle 12.

Controller 14 may determine that a detected vehicle operation event is associated with a visible indication from visible indication database 38. Controller 14 may then operate in accordance with programmed instructions 32 and visible indication database 38 to produce the selected visible indication. For example, controller 14 may operate vehicle lights 19 to operate (e.g., light, blink, or flash) in accordance with a predetermined sequence. Controller 14 may cause an appropriate image, sequence of images, video clip, video loop, or other visible content, to be displayed on an vehicle display 20 (e.g., an LED, LCD, plasma, or other flat display screen mounted on or incorporated into an exterior or interior surface of vehicle 12), on a window display 21 (e.g., a partially transparent or opaque display, e.g., an LCD, incorporated into a window of vehicle 21), or both. For example, programmed instructions 32 may include an appropriate video driver to enable controller 14 to control displayed content on vehicle display 20 or on window display 21.

In some cases, audible event indication system 10 may be configured for sound generation only, and not for visible indications. Such a sound generation system may then, lack a vehicle display or a window display. A data storage device of such a sound generation system may not be used to store a visible indication database.

Programmed instructions 32 may include instructions to execute a method for user selectable sound generation in a vehicle.

Figure 2:
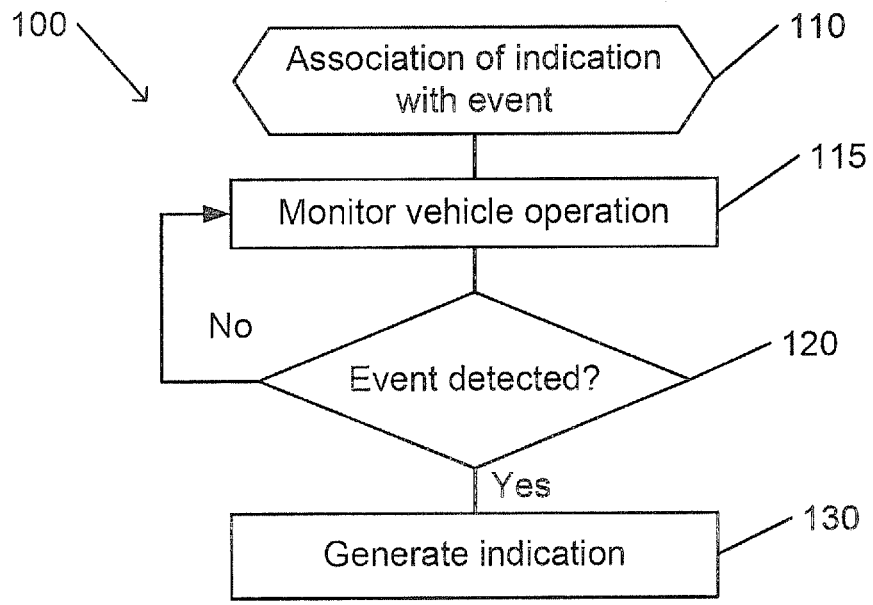
FIG. 2 is a flowchart of a method for user selectable audible event indication in a vehicle, in accordance with an embodiment of the present invention.

FIG. 2 is a flowchart of a method for user selectable audible event indication in a vehicle, in accordance with an embodiment of the present invention.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Event indication method 100 may be executed by a controller of a system for producing an exteriorly or interiorly audible indication of a vehicle operation event. Event indication method 100 may be executed automatically when the controller is operating (e.g., while an ignition switch of the vehicle is in an "On" position, or otherwise while the controller or the vehicle is operating), when execution is activated by a user, or in response to a predetermined event.

An audible indication may be associated with a vehicle operation event (block 110). For example, the association of the audible indication with the vehicle operation event may include a default association. A default association may have been defined or preset by a manufacturer, producer, or vendor of the vehicle, of the controller, or of a program or application for user selectable audible event indication in a vehicle. The association of the audible indication with the vehicle operation event may have been defined or initiated by a user. A previously defined or modified association of the audible indication with the vehicle operation event may have been modified by a user. In some cases, a visible indication may be associated, whether by default or by a user, with a vehicle operation event.

Operation of the vehicle may be monitored (block 115). For example, the controller may receive readings and data from various sensors. The controller may receive data related to vehicle operation from a vehicle computer.

The controller may interpret or analyze received data to determine if a vehicle operation event is detected (block 120). For example, a vehicle operation event may be detected when the received data corresponds to data that defines a vehicle operation event in an event database. If no vehicle operation event is detected, monitoring continues (return to block 115).

When a vehicle operation event is detected, an associated indication is generated (block 130). For example, a vehicle operation event in an event database may be associated with an audible indication in an audible indication database. The controller than controls a sound generator with speakers to generate an audible indication as defined in the audible indication database.

In some cases, the vehicle operation event may be associated with a visible indication in a visible indication database. The controller then produces an exteriorly or interiorly visible indication as defined in the visible indication database. For example, the controller may control lights to produce the visible indication as defined in the visible indication database. As another example, the controller may cause an image (e.g., single image, sequence of images, video clip or loop, or other image) to be displayed on a display of the vehicle.

In accordance with an embodiment of the present invention, a user may modify an association of an indication with a vehicle operation event.

Figure 3:
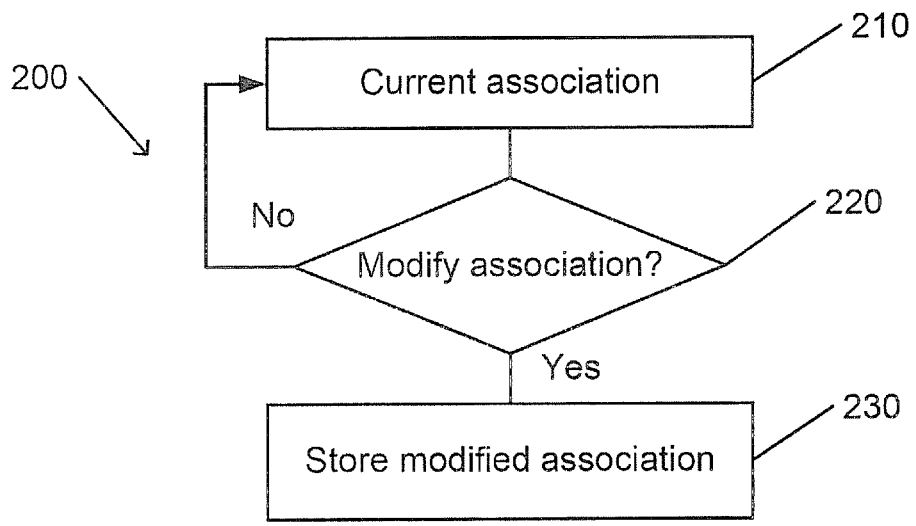
FIG. 3 is a flowchart of a method for user modification of an association of an indication with an event for an audible event indication in a vehicle, in accordance with an embodiment of the present invention.

FIG. 3 is a flowchart of a method for user modification of an association of an indication with an event for audible event indication in a vehicle, in accordance with an embodiment of the present invention.

Association modification method 200 may be executed by a controller of a system for producing an exteriorly or interiorly audible indication of a vehicle operation event. Association modification method 200 may be executed when the controller is connected to an interface device. For example, the controller may be connected to the interface device by a wired or wireless connection. When connected to the controller, the interface device may be located within the vehicle or outside of the vehicle. The controller may be operating in an active mode (e.g., while an ignition switch of the vehicle is in an "On" position, or otherwise while the vehicle is operating), in a standby mode (e.g., connected to a power source, such as a battery of the vehicle or to a separate power source), or otherwise available to communicate with the interface device. In some cases, execution of association modification method 200 may be initiated by a user when the user accesses a (e.g., event or indication) database of the controller.

An indication may be currently associated with a vehicle operation event (block 210). For example, the association of an exteriorly or interiorly audible or visible indication, or of any combination of the above, with the vehicle operation event may have been defined or preset as a default association. The association of the exteriorly or interiorly audible or visible indication, or of any combination of the above, with the vehicle operation event may have been defined or initiated by a user, or may have been previously modified by a user.

A user interface that is accessible via the interface device may enable a user to review the current associations. For example, a list of vehicle operation events may list the indications, if any, that are associated with each listed event. A single indication may be associated with two or more events, or with a group or family or similar or related vehicle operation events. Alternatively or in addition, a list of indications may list any vehicle operation events that are associated with each listed indication.

In reviewing, it may be detected or determined that a user has signaled an intention to modify an association, or has modified an association (block 220). For example, a user may have selected a control (e.g. "Edit" or "Modify" screen button) that indicates an intention to modify an association. As another example, the user may have edited or modified an association. Modifying an association may include, for example, modifying a definition of a vehicle operation event (e.g., by changing a parameter that defines the event, by defining a new event, or by deleting an event). Modifying an association may include modifying a definition of an indication (e.g., by changing a parameter that defines an indication, by defining a new indication, by uploading or recording audio or video content of an indication, by deleting an indication from a list, otherwise modifying an indication). Modifying an association may include changing a cause-effect relationship that indicates generation of a previously defined indication when a previously defined vehicle operation event is detected (e.g., creating a new relationship, deleting a relationship, or modifying a relationship to change the related vehicle operation event, indication, or both).

If no modification of an association is detected, the current associations continue to be applied (return to block 210).

If modification of an association is detected, the modified association may be stored in an appropriate database (block 230). Before saving, a user interface may request confirmation of a modification (e.g., by selection of an "OK" screen button, or otherwise). When indicated or required, the user interface may request completion of entered data (e.g., valid definitions of all parameters, upload of a file, or otherwise validly complete a definition of a vehicle operation event, of an indication, of an association between an event and an indication, or two or more of the above).

Once stored, the modified association may become the current association instead of the previous current association.

The invention claimed is:

1. A sound generation system for a vehicle, the system comprising:
    a sound generator for operating a speaker of the vehicle to produce an audible sound; and
    a controller to detect a vehicle operation event and to control the sound generator to generate an audible indication of the event, an association of the audible indication with the event being programmable by a user,
    wherein the controller is configured to control production of a visible indication of the event, an association of the visible indication with the event being programmable by a user, and wherein the visible indication comprises display of an image on a display of the vehicle.

2. The system of claim 1, wherein the visible indication comprises operation of a light of the vehicle.

3. The system of claim 2, wherein the operation of the light comprises flashing or blinking the light.

4. The system of claim 1, wherein the image comprises an image sequence, a video clip or a video loop.

5. The system of claim 1, wherein the visible indication is visible from inside or from outside of the vehicle.

6. The system of claim 1, wherein the vehicle is an electric or hybrid vehicle.

7. The system of claim 6, wherein the audible indication is imitative of a sound of an internal combustion engine.

8. The system of claim 1, wherein the vehicle operation event comprises a manner of driving of the vehicle.

9. The system of claim 8, wherein the manner of driving is selected from a group consisting of a vehicle speed, acceleration, deceleration, braking, or turning.

10. The system of claim 1, wherein the vehicle operation event comprises access to an interior of the vehicle.

11. The system of claim 10, wherein the access comprises opening a door of the vehicle.

12. The system of claim 1, further comprising a sensor, wherein the controller is configured to detect the vehicle operation event by receiving data from the sensor.

13. The system of claim 1, wherein the controller is configured to communicate with an interface device, the interface device being operable by the user to program the association of the audible indication with the event.

14. The system of claim 1, wherein the audible indication is audible from the exterior or the interior of the vehicle.

15. A method for sound generation in a vehicle, the method comprising:
    detecting a vehicle operation event;
    controlling a sound generator, the sound generator to operate a speaker to generate an audible indication of the event, an association of the audible indication with the event being programmable by a user, and
    generating a visible indication, an association of the visible indication with the event being programmable by a user,
    wherein the visible indication comprises displaying an image on a display of the vehicle.

16. The method of claim 15, wherein the vehicle operation event comprises a manner of driving of the vehicle, or access to an interior of the vehicle.

17. The method of claim 15, wherein the vehicle operation event comprises access to an interior of the vehicle.

* * * * *